9
United States Patent Office 3,311,594
Patented Mar. 28, 1967

3,311,594
METHOD OF MAKING ACID-STABILIZED, BASE REACTIVATABLE AMINO - TYPE EPICHLOROHYDRIN WET-STRENGTH RESINS
Ralph H. Earle, Jr., Claymont, Del., assignor to Hercules Incorporated, a corporation of Delaware
No Drawing. Filed Feb. 25, 1966, Ser. No. 529,936
15 Claims. (Cl. 260—77.5)

This application is a continuation-in-part of application Serial No. 284,003, filed May 29, 1963, now abandoned.

This invention relates to the preparation of acid-stabilized, base reactivatable, wet-strength resins and to their use as wet-strength additives in paper.

Very efficient wet-strength resins can be prepared by reacting epichlorohydrin with aminopolyamides, sometimes referred to as polyaminoamides, or polyaminoureylenes containing tertiary amino nitrogens. In the preparation of these resins it appears that the epichlorohydrin reacts with the tertiary amino nitrogens of the aminopolyamides or the polyaminoureylenes to form monochlorohydrin groups which can then dehydrohalogenate to monoepoxide groups. These reactions appear to proceed as follows:

(1)
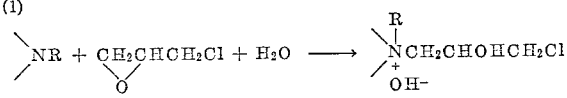

(2)
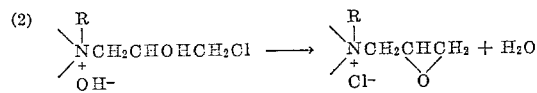

where >NR indicates the tertiary amino nitrogens, R being an alkyl or aryl group. Cross-linking can then occur by the reaction of the epoxide group of Equation 2 with a tertiary amino nitrogen as indicated in Equation 3 below:

(3)
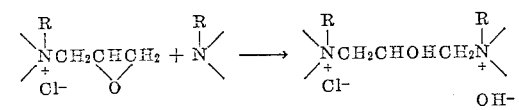

The above-described wet-strength resins have usually been stabilized by dilution without pH adjustment. These resin solutions are obtained at alkaline pH's, e.g., at pH's from about 7 to about 9. They have the advantage of imparting rapidly formed wet-strength to paper such that the wet-strengthening effect is largely obtained as the paper leaves the papermaking machine (uncured wet-strength). Moreover, such resins do not require an aging period of treatment at elevated temperature in order to obtain significant wet-strength development. However, they do have two major disadvantages. In order to prevent the gelation on storage of this type of resin for long periods, it is in practice necessary to dilute to relatively low solids levels. Moreover, the wet-strengthening properties of these resin solutions decrease rather rapidly on storage.

A principal object of this invention is the provision of acid-stabilized, base reactivatable resins of the indicated types having improved stability against gelation and loss of wet-strengthening properties.

Another object of the invention is the provision of a method of preparing acid stabilized, base reactivatable aqueous resin solutions of the above-described types.

Still another object of the invention is the provision of a method of reactivating wet-strength resins of the indicated types to restore wet-strength characteristics reduced by acid stabilization.

It has now been found that aqueous resin solutions of the above types can be stabilized by the addition thereto of a water-soluble acid, preferably a hydrogen halide acid, such as hydrochloric acid, in amounts sufficient to react with the tertiary amine or quaternary ammonium groups to form amine or ammonium salts, e.g., amine hydrogen halide or ammonium halide, as illustrated in Equations 1 and 2 below.

(1)
(2)
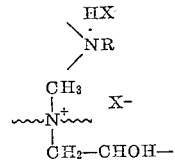

where X is an acid anion, and to cause halide ion to react with any epoxide groups present to reform halohydrin moieties. Water-soluble acids, other than hydrogen halide acids, can be used if the chloride ion concentration of the reaction mixture is sufficiently high, e.g., at least 0.1 N, and the reactivity or nucleophilicity of the acid anion is sufficiently low that the epoxide groups are converted essentially completely to the chlorohydrin. Examples of suitable hydrogen halide acids are hydrochloric acid, hydrobromic acid, hydrofluoric acid, and hydroiodic acid. Examples of other water-soluble acids that can be employed in carrying out this invention include sulfuric acid, nitric acid, phosphoric acid, and acetic acid.

Resins stabilized in the above manner have improved stability against gelation but reduced wet-strength characteristics. It is a further feature of the invention that the original wet-strength characteristics of these resins can be restored by reactivation with a base.

The polyamide-epichlorohydrin type resins contemplated for preparation and use herein are prepared from basic polyamides whose basicity is due primarily to the presence of tertiary amino groups. They may also contain smaller quantities of either primary and/or secondary amino groups and/or quaternary ammonium groups. However, tertiary amino groups should account for at least 70% of the basic nitrogen groups present in the polyamide.

These basic polyamides may be prepared by reacting a polyamine containing at least three amino groups, at least one of which is a tertiary amino group, with a saturated aliphatic dicarboxylic acid containing from 3 to 10 carbon atoms such as malonic, succinic, glutaric, adipic, suberic and so on, or with diglycolic acid. Blends of two or more of these dicarboxylic acids may also be used, as well as blends of one or more of these with higher saturated aliphatic dicarboxylic acids as long as the resulting long-chain polyamide is water-soluble or at least water-dispersible.

The polyamine reactant should have at least three amino groups, at least one of which is a tertiary amino group. It may also have secondary amino groups in limited amounts. Typical polyamines of this type suitable for use as hereinabove described are methyl bis(3-aminopropyl)amine, methyl bis(2-aminoethyl)amine, N-(2-aminoethyl)piperazine, 4,7 - dimethyltriethylenetetramine and so on, which can be obtained in reasonably pure form but also mixtures of various crude polyamine materials.

The temperatures employed for carrying out the reaction between the dicarboxylic acid and the polyamine may vary from about 110° C. to about 250° C. or higher at atmospheric pressure. For most purposes, however, temperatures between about 160° C. and 210° C. have been found satisfactory and are preferred. Where reduced pressures are employed, somewhat lower temperatures may be utilized. The time of reaction depends on the temperatures and pressures used and will ordinarily vary from about 1 to about 4 hours, although shorter or longer reaction times may be utilized depending on reaction conditions. In any event, the reaction is desirably continued to substantial completion for best results.

In carrying out the reaction, it is preferred to use an amount of dicarboxylic acid sufficient to react substantially completely with at least two of the amine groups of the polyamine. This will usually require a mole ratio of polyamine to dicarboxylic acid of from about 0.9:1 to about 1.2:1 and preferably from about 0.92:1 to 1.14:1. However, mole ratios of from about 0.8:1 to about 1.4:1 may be used with quite satisfactory results. Mole ratios outside of these ranges are generally unsatisfactory. Thus, mole ratios below about 0.8:1 result in a gelled product or one having a pronounced tendency to gel while mole ratios above about 1.4:1 result in low molecular weight polyamides. Such products do not produce efficient wet-strength resins when reacted with epichlorohydrin.

In converting the polyamide formed as above described to a cationic thermosetting resin, it is reacted with epichlorohydrin at a suitable temperature, i.e., at a temperature from about 25° C. to about 70° C., until the viscosity of a 20% solid solution at 25° C. has reached about C or higher on the Gardner-Holdt scale. This reaction is preferably carried out in aqueous solution to moderate the reaction. The reaction may also be moderated by decreasing the pH of the aqueous aminopolyamide solution with acid prior to addition of epichlorohydrin or immediately after the addition of epichlorohydrin. This adjustment is usually made to pH 8.5–9.5 but may be made to pH 7.5 in some cases with quite satisfactory results.

In the polyamide-epichlorohydrin reaction, it is preferred to use sufficient epichlorohydrin to react with substantially all of the amine groups. However, more or less may be added to moderate or increase reaction rates. In general, it is contemplated utilizing from about 0.8 mole to about 2.0 moles of epichlorohydrin per mole of polyamide amine. It is preferred to utilize from about 1.0 mole to about 1.7 moles of epichlorohydrin per mole of polyamide amine.

When the desired viscosity is reached, a water-soluble acid, preferably a hydrogen halide acid, e.g., hydrochloric acid, is added in an amount sufficient to convert the quaternary ammonium groups or tertiary amino groups to the corresponding ammonium or amine salts and to cause chloride ion to react with the epoxy groups to form chlorohydrin moieties. All the acid can be added at once or it can be added in increments or continuously over a period of time, e.g., 5 to 120 minutes, while heating at temperatures of from about 40° C. to about 80° C. or over a period of several days to several weeks at room temperature. Once the resin is effectively stabilized, the pH can be adjusted to 2.0 to 7.0 with a base to prevent irreversible hydrolysis of the polyamide backbone. Sufficient water is then added to adjust the solids content of the aqueous resin solution to the desired amount.

The amount of water-soluble acid required will usually approach stoichiometric equivalence to the amount of epichlorohydrin used to prepare the resin. However, quite satisfactory results are obtained if the ratio of equivalents of water-soluble acid to equivalents (moles) of epichlorohydrin is from about 0.3 to about 1.2.

The polyaminoureylene type resins contemplated for preparation and use herein are prepared by reacting epichlorohydrin with polyaminoureylenes containing free amine groups. These polyaminoureylenes are water-soluble materials containing tertiary amine groups and/or mixtures of tertiary amine groups with primary and/or secondary amino groups and/or quaternary ammonium groups. However, tertiary amino groups should account for at least 70% of the basic nitrogen groups present in the polyaminoureylene. These polyaminoureylenes may be prepared by reacting urea or thiourea with a polyamine containing at least three amino groups, at least one of which is a tertiary amino group. The reaction can, if desired, be carried out in a suitable solvent such as xylene.

The polyamine reactant should have at least three amino groups, at least one of which is a tertiary amino group. It may also have secondary amino groups in limited amounts. Typical polyamines of this type suitable for use as hereinabove described are methyl bis(3-aminopropyl)amine, methyl bis(2-aminoethyl)amine, N-(2-aminoethyl)piperazine, 4,7-dimethyltriethylenetetramine and so on, which can be obtained in reasonably pure form, but also mixtures of various crude polyamine materials.

The temperatures employed for carrying out the reaction between the urea or thiourea and the polyamine may vary from about 125° C. to about 250° C. at atmospheric pressure. For most purposes, however, temperatures between about 175° C. and about 225° C. have been found satisfactory and are preferred. The time of reaction will vary depending upon temperatures, etc., but will usually be from about ½ hour to about 4 hours. In any event, the reaction is desirably continued to substantial completion for best results.

In carrying out the reaction between the urea or thiourea and the polyamine, it is preferred to use a mole ratio of polyamine to urea or thiourea of about 1:1. However, mole ratios from about 0.7:1 to about 1.5:1 can be used and are contemplated as within the scope of the invention. Mole ratios outside these ranges are generally unsuitable for the purposes herein described.

In converting the polyaminoureylene, formed as above described, to a cationic thermosetting resin, it is reacted with epichlorohydrin at a temperature from about 25° C. to about 80° C., and preferably at a temperature from about 35° C. to about 50° C., until the viscosity of a 25% solids solution at 25° C. has reached about B or higher on the Gardner-Holdt scale. This reaction is preferably carried out in aqueous solution at solids concentrations from about 20% to about 50% to moderate the reaction. The reaction may also be moderated by decreasing the pH of the aqueous polyaminoureylene solution with acid prior to addition of epichlorohydrin or immediately after the addition of epichlorohydrin. This adjustment is usually made to pH 8.5–9.5 but may be made to pH 7.5 in some cases with quite satisfactory results.

In the polyaminoureylene-epichlorohydrin reaction, it is preferred to use a mole ratio of epichlorohydrin to free amine groups in the polyaminoureylene from about 1.0:1 to about 1.7:1. However, more or less may be added to moderate or increase reaction rates. In general, satisfactory results may be obtained utilizing from about 0.8 mole to about 2.0 moles of epichlorohydrin for each free amine group of the polyaminoureylene.

When the desired viscosity is reached, sufficient water is added to adjust the solids content of the aqueous resin solution to the desired amount, the product cooled to 25° C. and then stabilized by the addition of a water-soluble acid, and preferably a hydrogen halide acid. The amount of acid and the procedure followed are the same as for the polyamide-epichlorohydrin resins above described.

Following polymerization, and prior to acid stabilization as herein described, the above resins have excellent wet-strengthening properties. However, as a result of the acid stabilization treatment, there is a reduction in the wet-strengthening properties of these resins. It has been found, as another aspect of this invention, that the wet-strengthening properties of these resins can be restored and, in some cases, improved by a base reactivation treatment. This treatment involves adding to the resin solution an amount of base, either as a solid or as a solution, sufficient to reconvert the halohydrin groups to epoxides. This will usually require an amount of base approximately chemically equivalent to the amount of stabilizing acid present. However, from about 0.25 to about 2.5 times this amount can be used. The base can be added to the resin as prepared or the resin can be diluted prior to activation. Following activation, the solution can be used immediately, aged for from ten minutes to one week or more and then used, aged and then diluted for storage, or prepared and diluted immediately.

Both organic and inorganic bases can be used herein. Typical bases which can be used are the alkali metal hydroxides, carbonates and bicarbonates, calcium hydroxide, pyridine, benzyltrimethylammonium hydroxide, tetramethylammonium hydroxide, tetraethylammonium hydroxide, and so on.

Following base reactivation, as hereinabove described, the aqueous resin solutions may be applied to paper or other felted cellulosic products by tub application or by spraying, if desired. Thus, for example, preformed and partially or completely dried paper may be impregnated by immersion in, or spraying with, an aqueous solution of the resin, following which the paper may be heated for about 0.5 to 30 minutes at temperatures of 90° C. to 100° C. or higher to dry same and cure the resin to a water-insoluble condition. The resulting paper has greatly increased wet strength, and therefore this method is well suited for the impregnation of paper towels, absorbent tissue and the like, as well as heavier stocks such as wrapping paper, bag paper and the like, to impart wet-strength characteristics thereto.

The preferred method of incorporating these resins in paper, however, is by internal addition prior to sheet formation, whereby advantage is taken of the substantivity of the resins for hydrated cellulosic fibers. In practicing this method, an aqueous solution of the resin in its uncured and hydrophilic state is added to an aqueous suspension of paper stock in the beater, stock chest, Jordan engine, fan pump, head box or at any other suitable point ahead of sheet formation. The sheet is then formed and dried in the usual manner, the "off-the-machine" wet-strength, as previously indicated, being relatively high as compared with other types of alkaline-curing wet-strength resins.

In some commercial applications the "off-the-machine" wet-strength obtained with the cationic resins of the invention is ample and further curing is not necessary. However, in those commercial applications where additional wet-strength is desired, the paper may be subjected to a heat treatment for about 10 to 60 minutes at a temperature of about 105° C. to about 150° C. Additional wet-strength may also be gained by allowing the paper to age under the normal paper storage conditions.

The cationic thermosetting resins herein disclosed impart wet-strength to paper when present therein in relatively small amounts, i.e., about 0.01% or more, based on the dry weight of the paper. Generally, it will be desirable to use from about 0.1–3% by weight, based on the dry weight of the fiber. However, amounts up to 5% or more by weight, based on the dry weight of the fiber, can be used for special effects.

The following examples will illustrate specific embodiments of the invention. The parts referred to in the examples are parts by weight.

Example 1

Two hundred ninety-two parts (2.00 moles) of adipic acid was added to a solution of 304 parts (2.10 moles) of methyl bis-(3-aminopropyl)amine dissolved in 100 parts of water. The temperature was raised over a 2½ hour interval to 175° C. and held at this temperature for 4 hours. During this period 172 parts of water distilled from the reaction vessel. At the end of the heating period, the reaction mixture was cooled to 140° C. and diluted with 450 parts of water. The resulting solution contained 54.2% solids.

Fifty-eight and one-tenth parts (0.124 equivalent of amino nitrogen) of the above polyamide was reacted with 13.5 parts (0.146 mole) of epichlorohydrin in 153 parts of water at 40° C. for 100 minutes. The Gardner-Holdt viscosity of the reaction mixture was D. The resin was stabilized by dilution with water to 7.5% solids.

The Gardner-Holdt viscosity at 25° C. was A and the pH was 9.1. After 90 days at 90° F., the Gardner-Holdt viscosity at 25° C. was >C.

Example 2

A 20% solids aqueous solution containing 31.5 parts, dry basis, (0.124 equivalent of amino nitrogen) of the polyamide of Example 1 and 13.5 parts (0.146 mole) of epichlorohydrin was heated 55 minutes at 50° C. at which time the Gardner-Holdt viscosity at 25° C. of the reaction mixture was D. The reaction was terminated by the addition of 14.6 parts (0.15 equivalent) of 37% aqueous hydrochloric acid which reduced the pH of the solution to 0.3. A sample of this product (designated A) after storage at 90° F. for 135 days contained 19.5% solids and had a Gardner-Holdt viscosity at 25° C. of <A as compared with an initial Gardner-Holdt viscosity of C. Another sample of the product (105 parts) was held for 24 hours at about 25° C. and the pH was then adjusted to 4.0 with 2.2 parts (0.02 equivalent) of 40% aqueous sodium hydroxide. The Gardner-Holdt viscosity at 25° C. of this solution was B when fresh and after 135 days at 90° F. it was B/C. This product contained 19.9% solids and was designated B.

Example 3

The resin preparation of Example 1 was repeated, except that the resin was stabilized by the addition of 7.5 parts (0.08 equivalent) of 37% aqueous hydrochloric acid. This solution contained approximately 20% solids and had a Gardner-Holdt viscosity at 25° C. of <D. Within 4 days at 90° F., the solution had gelled. This product was designated C. A second repetition of Example 1 was carried out, except that the resin was stabilized by the addition of 14.6 parts (0.15 equivalent) of 37% aqueous hydrochloric acid. After 24 hours the pH was readjusted to 2.5 with 40% aqueous sodium hydroxide. This product, designated D, had a Gardner-Holdt viscosity at 25° C. of <B. After 97 days at 90° F., the resin had a Gardner-Holdt viscosity at 25° C. of B/C.

Example 4

An aminopolyamide was prepared as follows: 200 parts by weight of diethylenetriamine and 96.3 parts by weight of water were charged to a reaction vessel equipped with an agitator. The agitator was started and 290 parts by weight of adipic acid was added at the rate of about 18.7 parts per six minutes. After the acid was added, the temperature of the charge was raised to 170° C.±5° C. and held there for 1.5 to 3 hours. The reaction mixture was then cooled to 140° C. and diluted with sufficient water to adjust the solids content to about 50%. The product was then cooled to 25° C.

To 60 parts by weight of this aminopolyamide solution was added 225 parts by weight of water. This solution was heated to 50° C. and 12.5 parts by weight of epichlorohydrin was added dropwise over a period of 11 minutes. The contents of the flask was then heated to 60–70° C. until it had attained a Gardner-Holdt viscosity of >E. Then 150 parts by weight of water was added to the product and it was cooled to 25° C. Eleven parts by weight of 10% sulfuric acid was then added to adjust the pH to 5.0. The product contained 10% solids and had a Gardner-Holdt viscosity of C/D.

Example 5

Portions of resins A and B of Example 2, D of Example 3, and the resin of Example 4 were activated by addition of 40% aqueous sodium hydroxide (10 normal) at room temperature, aged from 1 to 4 hours, diluted to approximately 2% solids and then evaluated immediately in Tacoma bleached kraft pulp and alpha pulp for wet-strengthening properties in comparison with the corresponding unactivated resins. The amount of sodium hydroxide used was about equivalent to the epichlorohydrin plus the acid used to make the original resin. The procedure utilized in the evaluation was as follows:

Tacoma bleached kraft pulp or Weyerhaeuser alpha pulp was beaten at 2.5% consistency in a cycle beater to 750 cc. Schopper-Riegler freeness. The pH of the pulp slurry was adjusted to 7.5. The pulp was diluted to 0.28% consistency in the proportioner of a standard Noble wood handsheet apparatus. The resins to be evaluated were added to the proportioner as 2% solids solutions. Handsheets were prepared using a closed system in which the dilution water used had the following composition:

| | | |
|---|---|---|
| Calcium hardness | p.p.m. | 100±5 |
| MO alkalinity | p.p.m. | 50±5 |
| Sulfate | p.p.m. | 100 |
| Sodium | p.p.m. | 26 |
| Chloride | p.p.m. | 38 |
| pH | | 7.5 |

A portion of the resulting handsheets was given an additional cure by heating one hour at 105° C. The sheets tested for wet strength were soaked for 2 hours in distilled water prior to testing. The results are summarized in Table 1.

tenth parts of the original reaction mixture was acidified with 23.1 parts (0.24 equivalent) of 37% aqueous hydrochloric acid and designated F. This solution contained 18.6% solids, had a Gardner-Holdt viscosity at 25° C. of >D and a pH of 0.3. After 4 months' storage at 90° F., the Gardner-Holdt viscosity at 25° C. was D. Two hundred fifty parts of original reaction mixture was diluted with 200 parts of water and acidified with 19.4 parts (0.20 equivalent) of concentrated hydrochloric acid. After 17 hours, the pH was readjusted to 4.0 with 50% aqueous sodium hydroxide. This sample, designated G, had a Gardner-Holdt viscosity at 25° C. of A/B. After 4 months' storage at 90° F., the Gardner-Holdt viscosity at 25° C. was <B.

*Example 7*

This resin was prepared in the same manner as the resin designated F in Example 6.

*Example 8*

Two hundred sixteen parts (0.53 equivalent of amino nitrogen) of polyaminoureylene (prepared as in Example 6 above) was reacted with 73.4 parts (0.80 mole) of epichlorohydrin in 509 parts of water for 45 minutes at

TABLE 1

| Resin | Equivalents of base per Equivalent of acid | Wet Tensile, lb./in. width | | | | | | | | Pretreatment of Resin |
|---|---|---|---|---|---|---|---|---|---|---|
| | | Uncured | | | | Cured | | | | |
| | | 0.4% | 1.0% | 2.0% | 4.0% | 0.4% | 1.0% | 2.0% | 4.0% | |
| From Ex. 4 (Control) | | 3.2 | 4.7 | 4.8 | | 5.2 | 7.4 | 8.2 | | Unactivated. |
| Sample A, Ex. 2 | | 1.3 | 1.8 | 2.2 | | 2.2 | 3.1 | 3.9 | | Do. |
| Sample B Ex. 2 | | 2.6 | 3.2 | 3.6 | | 3.9 | 4.8 | 5.4 | | Do. |
| Sample A, Ex. 2 | 2 | 3.4 | 6.0 | 6.3 | | 4.5 | 7.5 | 7.7 | | Activated, aged 1 hour. |
| Sample B, Ex. 2 | 2 | 3.8 | 5.4 | 7.0 | | 4.9 | 7.0 | 8.3 | | Do. |
| From Ex. 4 | | 3.6 | 4.5 | 5.1 | 5.9 | 5.7 | 7.4 | 8.1 | 8.9 | |
| From Ex. 4 | (*) | 3.3 | 4.3 | 4.8 | | 5.2 | 7.1 | 7.9 | | Activated, aged 4 hours. |
| Sample D, Ex. 3 | 1 | 3.3 | 5.3 | 6.4 | 7.6 | 5.3 | 6.2 | 7.1 | 8.3 | Do. |
| Sample D, Ex. 3 | 1 | 2.5 | 3.1 | 3.2 | | 3.8 | 4.5 | 4.9 | | Unactivated. |
| 40 lb. Alpha Pulp Handsheets | | | | | | | | | | |
| From Ex. 4 | | 2.1 | 2.6 | 2.6 | | 3.9 | 4.7 | 4.7 | | |
| Sample D, Ex. 3 | | 2.2 | 3.0 | 3.2 | | 3.3 | 4.0 | 4.6 | | |

*Ratio equivalents base to epichlorohydrin 0.8.

*Example 6*

Four hundred thirty-five parts (3.0 moles) of methyl bis(3-aminopropyl)amine and 180 parts (3.0 moles) of urea were heated under an atmosphere of nitrogen to 212° C. over a period of 140 minutes. At this time approximately 96% of the calculated quantity of ammonia had been evolved from the reaction mixture. The polymer was diluted with 750 parts of water. The resulting solution contained approximately 42% solids.

Two hundred thirty-seven parts (0.53 equivalent of amino nitrogen) of the polyaminoureylene solution prepared as above containing 90.4 parts of solids was diluted with 509 parts of water. Seventy-three and four-tenths parts of epichlorohydrin was added at about 40° C. for 40 minutes. The Gardner-Holdt viscosity at 25° C. of the reaction mixture was D. A 250-part portion of this reaction mixture was diluted with 200 parts of water and designated E. It contained 9.3% solids, had a Gardner-Holdt viscosity at 25° C. of B and a pH of 10.0. After 4 months' storage at 90° F., the Gardner-Holdt viscosity at 25° C. was <C. Two hundred eighty-five and one-tenth parts of the original reaction mixture was acidified 40° C. as in Example 6. The reaction was terminated by addition of 26.8 parts (0.27 equivalent) of 37% aqueous hydrochloric acid. Within 24 hours the sample had gelled. A portion of the reaction mixture containing 413 parts was acidified to below pH 1 with 13.4 parts (0.14 equivalent) of additional 37% aqueous hydrochloric acid. A sample of this resin stored at 90° F. gelled within 13 days.

*Example 9*

This resin was prepared in the same manner as the resin in Example 4.

*Example 10*

Portions of the resin from Example 7 were activated in the same manner as the resins in Example 5 except that the amount of base was equivalent to the epichlorohydrin and aging was for 4 hours. These activated resins, together with the resins from Examples 6 and 9, and the unactivated resins from Example 7, were evaluated for wet-strength efficiency after aging for various periods. The procedure followed was the same as in Example 5. Results are set forth in Table 2 below.

TABLE 2

| Resin | Wet Tensile, lb./in. width | | | | | | Comments |
|---|---|---|---|---|---|---|---|
| | Uncured | | | Cured | | | |
| | 0.4% | 1.0% | 2.0% | 0.4% | 1.0% | 2.0% | |
| From Ex. 9 | 3.5 | 4.8 | 5.1 | 5.8 | 8.1 | 8.7 | Unactivated, 18 days old. |
| Sample E from Ex. 6 | 4.7 | 5.9 | 6.9 | 6.3 | 8.0 | 9.2 | Do. |
| Sample F from Ex. 6 | 2.9 | 3.3 | 3.0 | 4.5 | 5.3 | 5.0 | Do. |
| Sample G from Ex. 6 | 3.3 | 3.9 | 4.1 | 4.9 | 5.9 | 6.2 | Do. |
| Sample E from Ex. 6 | 3.0 | 3.9 | 4.8 | 4.3 | 5.8 | 7.2 | Unactivated, 55 days old. |
| Sample F from Ex. 6 | 2.6 | 2.9 | 3.1 | 3.8 | 4.4 | 4.8 | Do. |
| From Ex. 9 | 3.6 | 4.5 | 5.1 | 5.7 | 7.4 | 8.1 | |
| From Ex. 7 | 4.8 | 6.7 | 7.5 | 6.0 | 8.1 | 8.6 | Activated,* 18 days old. |
| From Ex. 9 | 3.8 | 4.9 | 5.0 | 5.9 | 8.2 | 8.9 | |
| From Ex. 7 | 5.1 | 7.9 | 8.8 | 6.5 | 8.8 | 9.8 | Activated,* 74 days old. |
| Do | 4.9 | 6.6 | 8.7 | 6.2 | 8.2 | 10.0 | Activated,* 120 days old. |
| | 40 lb. Alpha Pulp Handsheets | | | | | | |
| From Ex. 9 | 2.1 | 2.6 | 2.6 | 3.9 | 4.7 | 4.7 | Activated.* |
| From Ex. 7 | 3.5 | 4.2 | 4.5 | 5.1 | 5.6 | 5.8 | |

*Activated with 2.25 equivalents of base per equivalent of acid and aged 4 hours.

*Example 11*

Selected resins from Examples 2, 3 and 9 were evaluated for wet-strengthening properties at various aging periods. The procedure of Example 5 was followed except that the pulps used were Rayonier bleached kraft pulp and Weyerhaeuser alpha pulp. Results are set forth in Table 3 below.

*Example 12*

This resin was prepared in the same manner as the resin designated F in Example 6 except that the acid stabilization was accomplished with a chemically equivalent quantity of concentrated sulfuric acid rather than with hydrochloric acid. This resin, together with a resin prepared as in Example 7, was evaluated for wet-strength

TABLE 3

| Resin | Wet Tensile lb./in. width | | | | | | Pulp Used |
|---|---|---|---|---|---|---|---|
| | Uncured | | | Cured | | | |
| | 0.4% | 1.0% | 2.0% | 0.4% | 1.0% | 2.0% | |
| From Ex. 9 | 3.7 | 5.7 | 6.7 | 6.0 | 8.7 | 10.2 | TBK. |
| From Ex. 1 (15 days old) | 4.6 | 7.1 | 7.8 | 5.9 | 8.8 | 9.4 | TBK. |
| From Ex. 9 | 2.7 | 4.4 | 5.7 | 5.8 | 8.2 | 10.4 | TBK. |
| From Ex. 1 (65 days old) | 2.1 | 3.5 | 4.2 | 4.0 | 6.0 | 7.1 | TBK. |
| From Ex. 9 | 3.6 | 4.5 | 5.1 | 5.7 | 7.4 | 8.1 | RBK. |
| Sample D, Ex. 3* (20 days old) | 3.3 | 5.3 | 6.4 | 5.3 | 6.2 | 7.1 | RBK. |
| From Ex. 9 | 3.8 | 5.2 | 5.8 | 6.1 | 8.5 | 9.2 | RBK. |
| Sample D, Ex. 3* (75 days old) | 3.9 | 6.0 | 7.2 | 4.8 | 7.5 | 8.9 | RBK. |
| From Ex. 9 | 2.1 | 2.6 | 2.6 | 3.9 | 4.7 | 4.7 | Alpha. |
| Sample D, Ex. 3* | 2.2 | 3.0 | 3.2 | 3.3 | 4.0 | 4.6 | Do. |

*Base activated with 1 equivalent base per equivalent of acid, aged 4 hours.

efficiency after aging for various periods. The procedure followed was the same as in Example 5. The results are set forth in Table 4.

TABLE 4

| Resin | Wet Tensile, lb./in. width | | | | | | Comments |
|---|---|---|---|---|---|---|---|
| | Uncured | | | Cured | | | |
| | 0.4% | 1.0% | 2.0% | 0.4% | 1.0% | 2.0% | |
| From Example 12 | 3.2 | 5.3 | 6.5 | 4.6 | 7.2 | 8.3 | Activated,* 50 days old. |
| From Example 7 | 3.8 | 6.8 | 7.8 | 5.5 | 7.7 | 9.5 | Activated,* 98 days old. |
| From Example 12 | 3.5 | 4.9 | 5.9 | 5.2 | 7.3 | 9.6 | Activated,* 102 days old. |
| Do | 2.1 | 2.5 | 2.5 | 3.6 | 4.0 | 4.0 | Unactivated, 102 days old. |

*Activated with 1 equivalent base per equivalent acid, aged 4 hours.

Example 13

Four hundred twelve parts (1.0 equivalent of amine) of a polymer prepared as in the first paragraph of Example 6 was diluted with 480 parts of water. The pH of the solution was adjusted to 10.0 with 8.4 parts (0.09 equivalent) of concentrated hydrochloric acid. One hundred thirty-eight and eight-tenths parts (1.5 moles) of epichlorohydrin was added over a 5-minute interval. The reaction mixture was heated at 30–37° C. until a Gardner-Holdt viscosity at 25° C. of R was reached. The reaction was stopped by rapid addition of 59.5 parts (0.61 equivalent) of concentrated hydrochloric acid. The resin was stabilized by heating at 70° C. for 90 minutes while the pH of the solution was maintained at 2.0 by constant addition of hydrochloric acid. This required 59.2 parts (0.61 equivalent) of concentrated hydrochloric acid during this period. The resin obtained contained 30.9% solids, had a Gardner-Holdt viscosity at 25° C. of N and a pH of 2.0.

The efficiency of the resin was evaluated after it had been activated with different bases as summarized in Table 5. The evaluation was conducted in the same manner as described in Example 11. The data are summarized in Table 5.

acid was added. The autoclave was then slowly heated to 170° C. and maintained at 170–173° C. for four hours. Approximately 12.5 g. of distillate was collected during the reaction. The charge was cooled to 140° C. and dissolved in 40 g. of water. The product was an aqueous solution of a basic polyamide containing 53.2% solids.

Thirty-three grams of the above polyamide and 95.4 g. of water were weighed into a 250-ml., round-bottom, three-neck flask equipped with mechanical agitator and thermometer. The agitator was started, the charge was heated to 50° C. and 5.7 g. of epichlorohydrin (1 mole epichlorohydrin per mole of tertiary amine groups in polyamide) was added. The temperature of the solution was then raised to 65° C. and held between 65–70° C. until the viscosity of the resin reached H on the Gardner scale (measured at 25° C.). The polymerization was terminated by adding 325 g. of water. The final product was a clear, almost colorless solution with a pH of 8.6, a viscosity of >A and containing 4.6% solids.

The resins of Examples 15 and 16, like the resin of Example 1, will gel in aqueous solution of relatively high solids content. Reaction of the resins with acid, in accordance with the teaching of this invention, will prevent this gelation. The wet-strength imparting prop-

TABLE 5

| Resin | Base | Ml. Base/ 10 g. Resin | Wet Tensile lb./in. Width | | | | | |
|---|---|---|---|---|---|---|---|---|
| | | | Uncured | | | Cured | | |
| | | | 0.4% | 1.0% | 2.0% | 0.4% | 1.0% | 2.0% |
| From Example 13 | 10 N NaOH | 1.1 | 4.9 | 7.1 | 8.1 | 5.9 | 8.2 | 9.2 |
| Do | 10 N KOH | 1.1 | 4.2 | 5.4 | 7.6 | 5.6 | 6.9 | 9.4 |
| Do | 10 N pyridine | 1.1 | 3.0 | 3.3 | 3.4 | 4.1 | 5.0 | 5.2 |
| Do | 5 N $K_2CO_3$ | 2.2 | 4.6 | 7.1 | 8.6 | 5.9 | 8.3 | 10.0 |
| Do | 1 N $KHCO_3$ | 11.0 | 3.1 | 3.7 | 3.8 | 4.4 | 5.4 | 5.6 |
| Do | 2 N benzyl trimethyl ammonium hydroxide. | 5.5 | 3.4 | 4.1 | 5.1 | 4.9 | 5.7 | 7.0 |
| | | | 2.9 | 3.4 | 3.3 | 4.2 | 4.9 | 5.2 |

The following examples illustrate the preparation of other specific resins similar to Example 1. These resins can be similarly treated in accordance with this invention.

Example 14

Two hundred and ninety grams (2 moles) of methyl bis(3-aminopropyl)amine was weighed into a three-necked, round-bottom flask equipped with thermometer, mechanical stirrer, and condenser. The agitator was started and 268 grams (2 moles) of diglycolic acid was added. The charge was slowly heated to 160° C. After two hours at 160° C., 66.5 ml. of water had been distilled off. The charge was cooled to 140° C. and 400 ml. of water was added and the solution was cooled to room temperature. It contained 56.5% solids.

Forty-three grams of the above polyamide and 200 g. of water were stirred into a three-necked, round-bottom flask equipped with stirrer, thermometer and dropping funnel. The agitator was started and the contents of the flask was heated to 50° C. By means of the dropping funnel, 9.5 g. of epichlorohydrin was added dropwise in two minutes. Then the temperature of the reactants was raised to 65° C. and maintained between 60–70° C. until the viscosity of the product reached D (Gardner scale at 25° C.). The product was diluted with 150 ml. of water and cooled to 25° C. It had a pH of 8.2, a viscosity of B (Gardner), and contained 8.2% solids.

Example 15

Twenty-one and six-tenths grams (0.144 mole) of methyl bis(3-aminopropyl)amine and 10 grams of water were weighed into a small glass autoclave equipped with thermometer, mechanical stirrer and a condenser. The agitator was started and 26.0 g. (0.148 mole) of suberic erty of the resins, which is destroyed by reaction with acid, is regenerated by reaction with a base as herein described.

It will thus be seen that the acid-stabilized, base reactivatable resins of the invention have excellent stability against gelation and, when reactivated with base, are highly efficient wet-strength resins, particularly when used with high alpha pulps. These resins, moreover, give improved off-the-machine wet-strength and, in some cases, improved ultimate wet-strength.

What I claim and desire to protect by Letters Patent is:

1. The method of making an acid-stabilized, base reactivatable resin which comprises
   (1) reacting a polyamine having at least three amino groups, at least one of which is a tertiary amino group, with a material selected from the group consisting of
      (a) a dicarboxylic acid selected from the group consisting of diglycolic acid and $C_3$-$C_{10}$ saturated aliphatic dicarboxylic acids in a mole ratio of polyamine to dicarboxylic acid of from about 0.8:1 to about 1.4:1 to form an aminopolyamide containing free amino groups, at least 70% of which are tertiary amino groups, and
      (b) a material selected from the group consisting of urea and thiourea in a mole ratio of the former to the latter from about 0.7:1 to about 1.5:1 to form a material selected from the group consisting of a polyaminoureylene and a polyaminothioureylene containing free amino groups, at least 70% of which are tertiary amino groups,
   (2) reacting the material selected from the group consisting of the aminopolyamide, the polyaminoureylene and the polyaminothioureylene with epichlorohydrin in a mole ratio of epichlorohydrin to free amino groups of the aminopolyamide of from about 0.8:1 to about 2.0:1 and of the polyaminoureylene and polyaminothioureylene of from about 1.0:1 to about 1.7:1 to form an aqueous solution of a cationic thermosetting resin containing epoxide groups and chloride ions and then (3) reacting the resin, in aqueous solution, with from about 0.3 equivalent to about 1.2 equivalents per equivalent of epichlorohydrin, of a water-soluble acid until the epoxide groups are converted substantially to the corresponding halohydrin groups.

2. The method of claim 1 wherein the water-soluble acid employed in step (3) is selected from the group consisting of hydrochloric acid, hydrobromic acid, hydrofluoric acid, hydroiodic acid, sulfuric acid, nitric acid, phosphoric acid, acetic acid, and mixtures thereof.

3. The method of claim 1 wherein the water-soluble acid employed in step (3) is hydrochloric acid.

4. The method of claim 1 wherein the water-soluble acid employed in step (3) is sulfuric acid.

5. The method of claim 1 wherein from about 0.25 to about 2.5 equivalents, per equivalent of water-soluble acid, of a base is reacted with the aqueous resin solution.

6. The method of claim 5 in which the base is sodium hydroxide.

7. The method of making an acid-stabilized, base reactivatable resin which comprises
   (1) reacting a polyamine having at least three amino groups, at least one of which is a tertiary amino group, with a dicarboxylic acid selected from the group consisting of diglycolic acid and $C_3$–$C_{10}$ saturated aliphatic dicarboxylic acids in a mole ratio of polyamine to dicarboxylic acid of from about 0.8:1 to about 1.4:1 to form an aminopolyamide containing free amino groups, at least 70% of which are tertiary amino groups,
   (2) reacting the aminopolyamide with epichlorohydrin in a mole ratio of epichlorohydrin to free amino groups of from about 0.8:1 to about 2.0:1 to form an aqueous solution of a cationic thermosetting resin containing epoxide groups and chloride ions, and then
   (3) reacting the resin, in aqueous solution, with from about 0.3 equivalent to about 1.2 equivalents per equivalent of epichlorohydrin, of a water-soluble acid until the epoxide groups are converted substantially to the corresponding halohydrin groups.

8. The method of claim 7 wherein the polyamine having at least three amino groups is methyl bis(3-aminopropyl) amine.

9. The method of claim 8 wherein the dicarboxylic acid reactant is adipic acid.

10. The method of claim 9 wherein the water-soluble acid is hydrochloric acid.

11. The method of claim 9 wherein the water-soluble acid is sulfuric acid.

12. The method of making an acid-stabilized, base reactivatable resin which comprises
    (1) reacting a polyamine having at least three amino groups, at least one of which is a tertiary amino group, with urea in a mole ratio of the former to the latter of from about 0.7:1 to about 1.5:1 to form a polyaminoureylene containing free amino groups, at least 70% of which are tertiary amino groups,
    (2) reacting the polyaminoureylene with epichlorohydrin in a mole ratio of epichlorohydrin to free amino groups of the polyaminoureylene of from about 1.0:1 to about 1.7:1 to form an aqueous solution of a cationic thermosetting resin containing epoxide groups and chloride ions and then
    (3) reacting the resin, in aqueous solution, with from about 0.3 equivalent to about 1.2 equivalents per equivalent of epichlorohydrin of a water-soluble acid until the epoxide groups are converted substantially to the corresponding halohydrin groups.

13. The method of claim 12 wherein the polyamine having at least three amino groups is methyl bis(3-aminopropyl) amine.

14. The method of claim 12 wherein the water-soluble acid is hydrochloric acid.

15. The method of claim 12 wherein the water-soluble acid is sulfuric acid.

References Cited by the Examiner
UNITED STATES PATENTS

| | | | |
|---|---|---|---|
| 2,849,411 | 8/1958 | Lehmann et al. | 260—29.2 |
| 3,197,427 | 7/1965 | Schmalz | 260—78 |
| 3,215,654 | 11/1965 | Schmalz | 260—78 |
| 3,240,664 | 3/1966 | Earle | 162—164 |

DONALL H. SYLVESTER, *Primary Examiner.*

S. LEON BASHORE, *Examiner.*